May 30, 1933.  I. B. YASSIN  1,911,663
DIFFERENTIATOR
Filed April 7, 1930  2 Sheets-Sheet 1
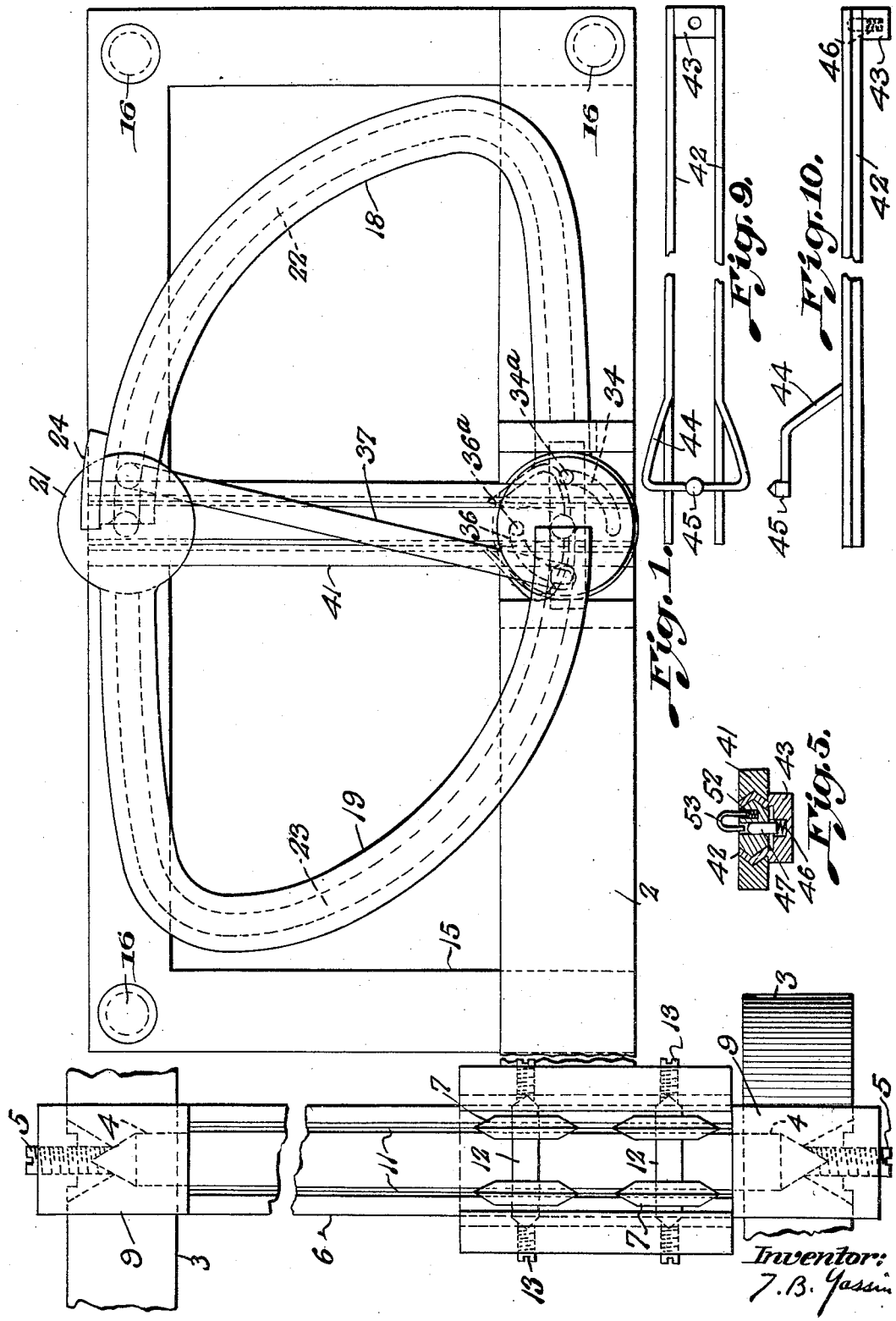

May 30, 1933. I. B. YASSIN 1,911,663
DIFFERENTIATOR
Filed April 7, 1930 2 Sheets-Sheet 2
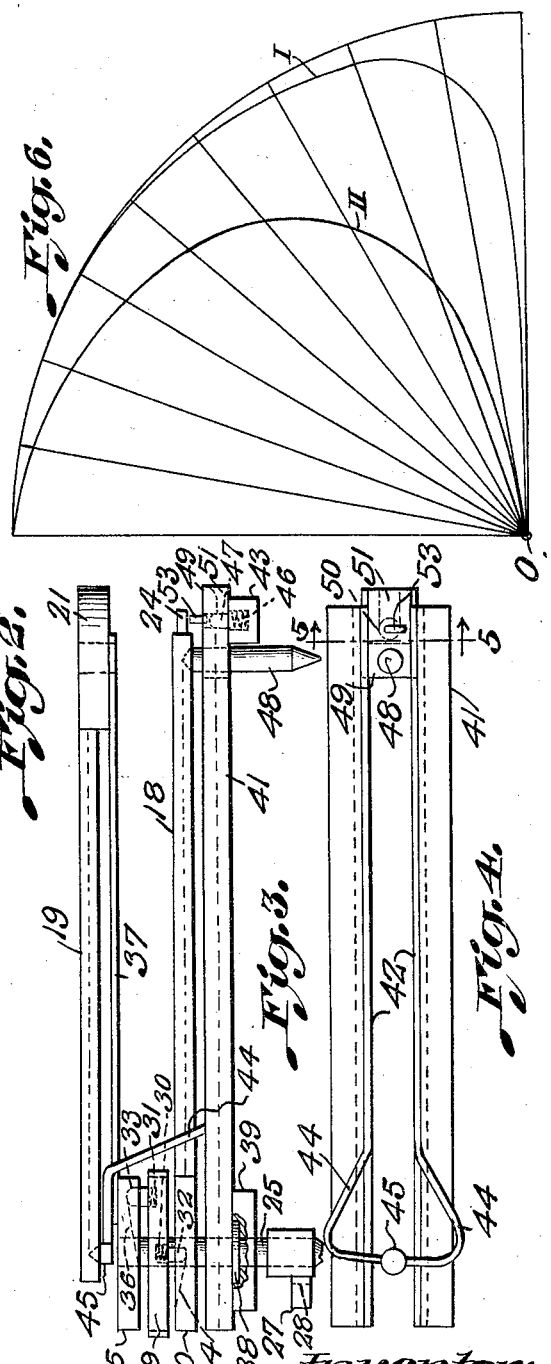
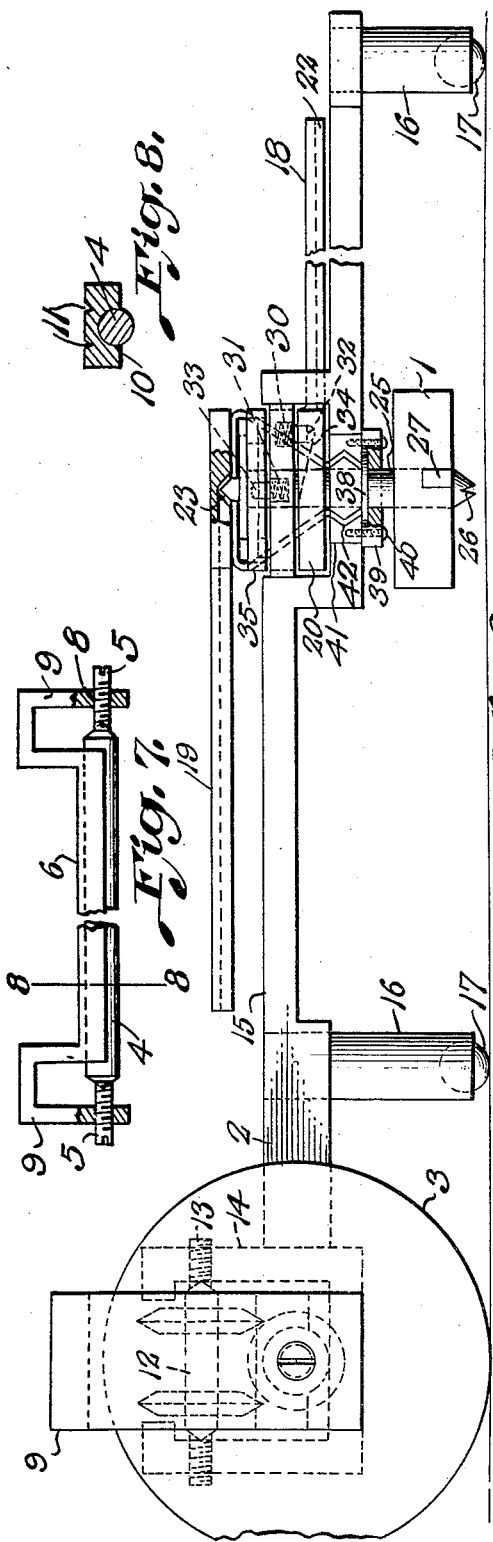
Inventor:
I. B. Yassin

UNITED STATES PATENT OFFICE

I. B. YASSIN, OF CAMBRIDGE, MASSACHUSETTS

DIFFERENTIATOR

Application filed April 7, 1930. Serial No. 442,368.

In a great deal of engineering work it is often found necessary to develop differential curves from given integral curves. The most exact method employed is one of arduous mathematical transformation and computation. Another—the more common way—is to graphically differentiate the given integral curve point by point and then plot the results. The accuracy of this method obviously depends on how close together the successive points are taken and the attitude of the worker. Therefore if the first method is impracticable because of the time factor the second is of doubtful value because of the inaccuracies.

To do away with the faults of both methods I have devised a machine which traces mechanically an accurate differential curve from a given integral curve having any slope either positive or negative.

The theory of this machine is based on the well known principle of elementary calculus, namely that the slope of any curve is $$\tan \theta = \frac{dy}{dx}$$

By assuming an initial definite length for $dy$ and maintaining $dx$ constant (the constant abscissa $dx$ representing a constant unit of time or any other factor considered) the curve of the variations of the ordinate $dy$ as the slope of the integral curve changes is the differential curve of the integral curve.

To produce this curve of the variations of the ordinate $dy$ as the slope of the integral curve changes, I have designed a cam to the formula given above or simply as $y = x \tan \theta$; keeping $x$ constant at some fixed maximum values of $y$ and $\theta$. In this case I have made the cam shape conform to maximum values of four inches for $y$ and 89° for $\theta$. Other values for maximum $y$ and $\theta$ may be taken at will by the designer depending on the size of machine wanted and to what degree of accuracy the differential curves are desired. With the above assumptions the different values of $y$ were computed for different values of $\theta$ and a cam drawn of the shape shown in Fig. I. Different assumptions for maximum slope will produce a different shaped cam. It is to be understood that I do not limit myself to the particular shape shown by above assumptions, but may use different cams to suit the accuracy of the work required. For example, Fig. 6 curve II is a cam shape for $\theta = 80°$ and $y = 4$ inches.

In the machine two such cams must be used, one for the positive slopes and the other for negative slopes of the integral curve. A pencil or other tracing means which is constrained to move in an up and down direction is made to follow in grooves in the cams so that as the cam is turned to follow changes in the slope of the integral curve the pencil will move up or down to give corresponding changes of ordinate of the new differential curve. As the integral curve follower is moved along that curve the above mentioned pencil will trace a differential curve.

The main object of this invention is to produce a machine of relative simple construction which will trace accurately a true differential curve from a given integral curve.

A further object is to produce a machine in which the resulting curve is produced by cams positively acting on a pencil carrying block so that the said curve is smooth and accurate.

Another object is to have the resulting curve of positive slopes of the given curve produced by one cam and the resulting curve of negative slopes of the given curve produced by another cam.

Another object is to produce a simple and efficient means whereby the pencil block which carries the tracing pencil is released from the influence of the positive slope cam and placed under the actuation of the negative slope cam.

Another object is to produce an efficient bearing and supporting means for the peg that carries the follower so that the said peg is always in a perfectly vertical position at all times and thus cause the follower to accurately follow tangent to the given curve.

A further object is to produce accurate means whereby the follower will be kept accurately tangent to the given curve.

A further object is to produce a device which is of substantial construction and will not be easily put out of adjustment.

With these and other objects in view, as will become obvious as the description follows, the accompanying drawings must be referred to in order that a comprehensive understanding of the differentiator may be obtained.

Figure 1 is a plan view of the machine.

Figure 2 is an elevation with parts broken away to facilitate illustration.

Figure 3 is a side elevation of the central guide and support member entirely removed from the framework.

Figure 4 is a plan view of Figure 3 with the cams, disks, peg and follower removed.

Figure 5 is a section on line 5—5 on Figure 4 looking in the direction of the arrows.

Figure 6 shows two different designs of cam curves.

Figure 7 shows a view of the yoke member which fits upon the axle of the main rollers and carries the tracks for the small rollers.

Figure 8 is a section on line 8—8 of Figure 7.

Figures 9 and 10 are plan and elevation views respectively of the central track member removed from the rest of the structure.

The differentiator is mounted for movement in all directions in the horizontal plane in response to the movement of the grip 1 (Fig. 2) by the operator. This mounting is designated as a whole by 2 and consists of wheels 3 integral with the shaft 4 whose ends are pointed or conical shaped so that they may fit into complementary hollows in the screws 5 which screws act as bearing points being secured in the yoke member 6. This portion of the mounting is for movement in a left and right direction as seen in Figure 1.

Figures 7 and 8 show the yoke 6 and how it is mounted upon the shaft 4. Upon this yoke wheels 7 are mounted upon tracks parallel to the axis of the shaft 4 so that the rest of the framework carrying the cams may be moved in an up and down direction as seen in Fig. 1. The shape of this yoke is as shown in Figure 7 purposely made of such a shape so that movement of the shaft 4 and wheels 3 may not be obstructed. The screws 5 pass through holes 8 in the end portions 9 of the yokes. These screws bear only a small part of the weight of the yoke and the framework. The shaft 4 functions to carry most of this weight. On Figures 7 and 8 it is seen that the yoke rests on the shaft 4 between the wheels 3. To keep it from coming loose from the shaft during operation the hollow groove 10 which fits around the shaft is bored to a depth greater than one-half diameter of the shaft. Hence the yoke fits around the shaft so that it cannot come loose. In order to remove the shaft from the yoke it is necessary to draw it out longitudinally after having removed the screws 5 and the wheels 3.

On the yoke portion between the wheels 3 are formed tracks or grooves 11 upon which are adapted to ride two sets of wheels 7 made integral with shafts 12 or otherwise fixed so that they will move in unison. The ends of these shafts are also conical in shape and fit into complementary grooves in screws 13 which act as bearings for shaft 12. These screws also act as supports for the brace or yoke 14. This yoke is U-shaped in section as seen in Fig. 2 and straddles the shaft below. Integral with this yoke or otherwise connected to it is the rest of the framework 15 which in plan, as seen in Fig. 1, is substantially of oblong shape. On three corners of the rectangle are mounted legs 16 upon which the framework carrying the cams rests. Ball bearings 17 are fitted into the bottoms of these legs as a friction reducing means. The fourth corner of the frame is amply supported by the rollers 7.

The cams 18 and 19 are mounted on the framework 15 so that they may rotate about an axis 0 normal to the plane of the paper as seen on the graph of the cam curve on Figure 6. Cam 18 is rigidly connected to disk 20 mounted in the lower portion of the framework and about whose center it must rotate. Cam 19 is also rigidly connected to a disk 21 which is rotatably mounted in the upper portion of the framework. Each of these cams has a V-shaped groove designated 22 and 23 in which some follower will be constrained to move as will be explained below. Cam 18 also has a lug 24 attached to its upper end, the purpose of which will be explained further on.

Referring more particularly to Figures 2, 3, 4 and 5, there is a rod 25 running down through the framework to the bottom of which is rigidly attached the grip 1 which, as will later be seen, is held by the operator in following along the integral curve. This rod extends almost to the surface of the medium upon which the given curve is drawn and at its bottom is formed with two points 26, a very small distance apart, aligned parallel to the long axis of the grip. These points are both kept on the given curve at the same time so that the curve will be followed tangentially by the grip. Another method used to check the first and which gives a true tangent at a point on the curve is the attachment of a mirror 27 perpendicular to the grip so that when the drawn curve and its image in the mirror appear as a continuous line the mirror is perpendicular to the point considered on the curve and consequently the grip is tangent. A reference mark 28 on the mirror is used to follow the curve.

Near the top of rod 25 is rigidly fixed a disk 29 in which two holes are counter sunk.

Hole 30 is bored into the bottom side of the disk while 31 is bored into the top side and is 90° from 30. Both 30 and 31 are the same radial distance from the center of the disk. Within these bores are placed pins 32 and 33 which are pressed outwardly by suitable springs. These pins have small abutments (not shown) at their bottoms so that they may be retained in place. The disk 20 has on its upper surface a quarter circle groove 34 tapering in depth to about half the thickness of 20 at point 34a (Figure 1).

On rod 25 near its upper portion is loosely mounted the disk 35 which has in its lower surface a quarter circle groove 36 similar to groove 34, tapering in depth to about half the thickness of 35 at point 36a. Relative positions of grooves in assembly shown are in opposite quadrants.

Disk 35 is connected with disk 21 by a link 37.

It is to be understood that disks 20 and 35 are not directly connected with the rod 25, but are loosely mounted thereon. The disk 29, however, is rigidly connected to or integral with the peg 25.

In order that the rod 25 may be retained in its place and kept perfectly vertical a novel bearing and supporting means is provided. The rod has integral with it or otherwise rigidly connected to it a washer-like abutment 38 which has a perfectly flat machined surface. This abutment fits into a complementary hollow in a nut 39 which nut is accurately machined and which is held in place against the framework by screws 40 (Fig. 2), thus acting as a lower bearing for the rod 25. A support for the upper portion of the rod is obtained by making disk 29 of a somewhat larger diameter than the other disks so that it can journal in portions of the framework suitably constructed for the purpose.

From the above description it is readily seen that as grip 1 is rotated in one direction (e. g. counterclockwise as seen on Figure 1) it will rotate rod 25 so that pin 32 will engage disk 20 in slot 34 at 34a and thereby rotate the disk 20 and the cam 18 which is integral with 20. During this rotation pin 33 will ride idly in groove 36 of disk 35. If the grip is now rotated in a clockwise direction from its present position as seen on the drawings, the pin 33 will engage the end of the slot 36 of disk 35 at 36a and will rotate disk 35 which, through the link 37 will rotate disk 21 and cam 19 in a reverse direction from that of 35.

The central support and guideway for the pencil block consists of a stationary portion 41 (stationary with respect to the framework 15) integral with or otherwise fixed to 15. It has V-shaped grooves or tracks running the whole length of this member and in which grooves are adapted to slide a correspondingly shaped member 42. This member 42 (Figures 9 and 10) consists itself of two main parts of V-shaped section which form tracks for the pencil block, and these parts or tracks are interconnected at one end by the member 43, whose function will be described, and near the other end by the members 44 which members at their converging point have connected to them the follower 45 for the cam groove 23 in the cam 19. The peculiar shaping of the members 44 is necessary to avoid interference with the disks and the interconnecting link 37.

The interconnecting block 43 (Fig. 5) has a countersunk bore in which a compression spring 46 fits to push the pin 47 upwards. This pin fits into a corresponding hole in the pencil block and as will be described, constrains the pencil block to move with the member 42 in certain directions while in other directions it is forced out of the hole and slides clear of the pencil block so that the said block is free to move relative to the tracks 42.

The follower 45 for the cam 19 by its movement in the cam groove 23 moves the whole member 42 including the part 43 and the pencil block when the same is engaged by the pin 47.

The pencil or similar scribing means which is to trace the differential curve is designated by 48 and is rigidly mounted in a pencil block 49. It has a conical shaped portion protruding upwards so that it will fit into the groove of cam 18 and thus be affected by movement of such cam. At about the center of the pencil block there is bored a hole 50 which runs clear through and leading from that is a channel 51 which runs back to the end of the block. This channel is on the under portion of the block as seen on Figures 3 and 4, and is of a depth less than half the thickness of the block. As is seen from Figure 3 when pin 47 is in its uppermost position, it extends beyond the top of the channel so that when moved laterally the pin will not slip out of engagement with the block. In the pencil block is also countersunk a small hole into which a spring 52 fits to force upwards a hook shaped member 53, the hook end of which fits into the hole 50.

The purpose of this hook 53 is to function as a means to disengage the pencil block from the influence of the member 42 through 46 and pin 47. This disengagement is accomplished by forcing the pin downward to a sufficient extent so that it can slide out through the channel 51.

The operation of the differentiator is as follows: Assuming we have drawn a given curve, the differential curve of which is wanted. The machine is placed on the surface containing the given curve so that the wheels 3 are parallel to the zero axis of the curve and the shaft 4 is perpendicular to that axis. The operator holds the grip 1 and follows tangent to the curve which result is attained by keeping points 26 on the curve or by use of the mirror 27. Following along a positive slope of the curve and maintaining the grip tangent as the grip rotates through angles conforming to the slope of the curve, the rod 25 and the disk 29, both integral with the grip also rotate all in a counter clockwise direction as seen on Figure 1. Such rotation causes the pin 32 to rotate the disk 20 and cam 18 through engagement with the end of the slot 34. This same rotation causes the pin 33 to move idly in slot 36 in disk 35 so that cam 19, which is for negative slopes is not moved. When the cam 18 starts its rotation counterclockwise, the protruding portion 24 on this cam engages the hook shaped member 53, forcing it downward so that pin 47 is pushed down below the top of channel 51, thus freeing the pencil block so that it can follow up or down in the tracks 42 in response to the rotation of the cam 18. This movement of the follower in the groove 22 moves the pencil correspondingly which draws the differential curve of the positive slope of the integral curve. When the slope changes to negative it must pass through zero slope position which position is that shown on the drawings, the pin 47 having slid back through the channel 51 into engagement with the pencil block. The grip now rotating in a clockwise direction causes engagement of the pin 33 with the end of the slot 36 in disk 35 so that through link 37 disk 21 and cam 19 are rotated with the consequential movement of follower 45, members 42 and 43 and pencil block 49. By the change of slope, the follower of the cam 18 is disengaged from its slot 22 so that the pencil block is free to move under the influence of cam 19.

What I claim is:

1. In a device of the class described, means with which to trace along a given curve, means to draw the differential curve of said given curve and cam means actuated by the movement of said first means to guide said second means in its movement.

2. In a device of the class described, means with which to trace along a given curve, means responsive to a counter-clockwise change in a direction of said tracing means to draw the differential curve of the positive slope of the given curve and other means responsive to a clockwise change in direction of said tracing means to draw the differential curve of the negative slope of the given curve.

3. In a device of the class described, means with which to trace along a given curve, said means being rotatable, means to draw the differential curve of said given curve, means responsive to the rotation of said tracing means in one direction to engage said drawing means to draw the differential curve of positive slopes of the given curve and other means responsive to the rotation of said tracing means in the other direction to engage said drawing means to draw the differential curve of negative slopes of the given curve.

4. In a device of the class described, a framework, cams mounted on said framework, a curve follower, means responsive to the movement of said follower to actuate said cams, a scribing means, and means actuated by the actuation of said cams to actuate said scribing means.

5. In a device of the class described, a framework, cams mounted on said framework, a rotatable curve follower, means responsive to the rotation of said follower to rotate said cams, a scribing means, and means actuated by the rotation of said cams to actuate said scribing means.

6. In a device of the class described, a framework, cams mounted for rotation upon said framework, a curve follower, means responsive to rotation of said follower in one direction to rotate one of said cams, means responsive to the rotation of said follower in another direction to rotate another of said cams, a scribing means, means actuated by the first of said cams to actuate said scribing means in one direction and means actuated by another of said cams to actuate said scribing means in another direction.

7. In a device of the class described, a framework, a cam mounted for rotation in the lower portion of the framework, a second cam mounted for rotation in the upper portion of said framework, a grip, means responsive to the rotation of said grip in one direction to rotate one of said cams, means responsive to the rotation of said grip in the other direction to rotate the other of said cams, a scribing means, means actuated by the first of said cams to actuate said scribing means in one direction and means actuated by the other of said cams to actuate said scribing means in the opposite direction.

8. In a device of the class described, means to trace tangent to a given curve, said means being rotatable, scribing means to draw the differential curve of said given curve, a block, said scribing means mounted in said block, tracks on which said block is slidable, means actuated by rotation of said tracing means in one direction to move said block and scribing means in one direction, and other means actuated by the rotation of said tracing means in the other direction to move said block and scribing means in the opposite direction.

9. In a device of the class described, means with which to trace tangent to a given curve, scribing means to draw the differential of said given curve, a block in which said scribing means is mounted, tracks for said block, means to engage said block for movement with said tracks and means to disengage said engaging means to allow movement of said block relative to the said tracks.

10. In a device of the class described, a framework, cams mounted on said framework, means with which to trace tangent to a given curve, scribing means to draw the differential of said given curve, a block, said scribing means mounted in said block, tracks, a cam follower interconnecting said tracks, said block mounted in said tracks, one of said cams adapted to engage said block and the other of said cams adapted to engage said cam follower.

11. In a device of the class described, means with which to trace along a given curve tangent to it, said means consisting of a grip, a rod running through said grip about whose center said grip is rotatable and index points at the end of said rod spaced parallel to the long axis of said grip for maintaining said grip tangent to said given curve.

12. In a device of the class described, means with which to trace along a given curve tangent to it, said means consisting of a grip, a rod running through said grip about whose center said grip is rotatable, reflecting means arranged on said grip perpendicular to the long axis thereof and an index on said reflecting means for maintaining said grip tangent to said given curve.

13. In a device of the class described, a framework, a rod mounted for rotation in said framework, a bearing plate rigidly connected to said rod adapted to provide a longitudinal bearing surface for said rod and a disk rigid with said peg adapted to provide a lateral bearing surface for said rod.

14. In a device of the class described, a framework, a rod mounted for rotation in said framework, bearings in said framework, journal means for said rod including a bearing plate and a disk member both rigidly connected to said rod, said plate and said disk adapted to fit in the bearings provided in said framework.

15. In a device of the class described, a framework, means with which to trace along a given curve, supporting means mounted in said framework by which said tracing means is carried, said last named means including a rod, bearing plates integral with said rod, bearings in said framework in which said bearing plates are adapted to fit.

16. In a device of the class described, a framework, a rod mounted for rotation in said framework, bearing means for said rod to prevent longitudinal movement thereof including a bearing plate integral with said rod, a hollow nut into which said plate is seated and means to secure said nut to said framework.

I. B. YASSIN.

CERTIFICATE OF CORRECTION.

Patent No. 1,911,663.　　　　　　　　　　　　　　　　　　May 30, 1933.

I. B. YASSIN.

It is hereby certified that error appears in the printed specification of the above numbered patent requiring correction as follows: Page 5, line 36, claim 13, for "peg" read rod; and that the said Letters Patent should be read with this correction therein that the same may conform to the record of the case in the Patent Office.

Signed and sealed this 14th day of November, A. D. 1933.

(Seal)

F. M. Hopkins
Acting Commissioner of Patents.